United States Patent [19]

Liljegren

[11] 4,430,044
[45] Feb. 7, 1984

[54] VERTICAL AXIS WIND TURBINE

[76] Inventor: L. Kenyon Liljegren, 1260 SE. Walnut #5, Tustin, Calif. 92680

[21] Appl. No.: 324,103

[22] Filed: Nov. 23, 1981

[51] Int. Cl.³ .............................................. F03D 7/06
[52] U.S. Cl. .................................. 416/119; 416/132 B; 416/139
[58] Field of Search .................... 416/119, 17, 139 A, 416/DIG. 8, 132 B

[56] References Cited

U.S. PATENT DOCUMENTS

| | | | |
|---|---|---|---|
| 1,582,361 | 4/1926 | Welsch | 416/119 X |
| 1,592,242 | 7/1926 | Welsch | 416/119 X |
| 1,835,018 | 12/1931 | Darrieus | |
| 3,874,816 | 4/1975 | Sweeney et al. | 416/139 |
| 3,918,839 | 11/1975 | Blackwell et al. | 416/175 |
| 3,942,909 | 3/1976 | Yengst | 416/132 |
| 4,003,676 | 1/1977 | Sweeney et al. | 416/132 |
| 4,048,947 | 9/1977 | Sicard | 416/119 X |
| 4,052,134 | 10/1977 | Rumsey | 416/119 |
| 4,105,363 | 8/1978 | Loth | 416/41 |
| 4,180,367 | 12/1979 | Drees | 416/119 |
| 4,204,805 | 5/1980 | Bolie | 416/119 |
| 4,248,568 | 2/1981 | Lechner | 416/132 |
| 4,334,823 | 6/1982 | Sharp | 416/119 |
| 4,368,392 | 1/1983 | Drees | 416/119 X |

FOREIGN PATENT DOCUMENTS

| | | | |
|---|---|---|---|
| 1045038 | 12/1978 | Canada | 416/119 |
| 2827044 | 12/1978 | Fed. Rep. of Germany | |
| 2745862 | 4/1979 | Fed. Rep. of Germany | |
| 2919328 | 11/1980 | Fed. Rep. of Germany | 416/17 |
| 2289769 | 5/1976 | France | 416/17 |
| 2468002 | 5/1981 | France | 416/119 |
| 2481756 | 11/1981 | France | 416/140 R |
| 301091 | 1/1930 | United Kingdom | 416/119 |
| 1468338 | 9/1977 | United Kingdom | 416/119 |

OTHER PUBLICATIONS

WINDPOWER, A Handbook On Wind Energy Conversion Systems, by V. Daniel Hunt, Dir., The Energy Institute, pp. 553, 104, 123–126, 186–187, 246, 241, 192, 194–195.

*Primary Examiner*—Everette A. Powell, Jr.
*Attorney, Agent, or Firm*—Knobbe, Martens, Olson & Bear

[57] ABSTRACT

A wind turbine is disclosed comprising blade forms mounted for limited pivotal movement as they proceed around an orbital path. A torque sensitive control means is provided to progressively limit the pivotal movement of the blade forms in response to changes in the rotational speed of the turbine so that high torque and efficiency is obtained throughout the operational range of the turbine.

37 Claims, 17 Drawing Figures

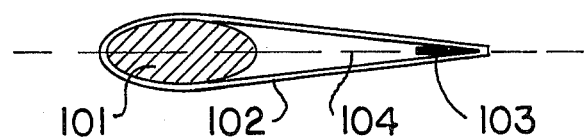
FIG. 5.
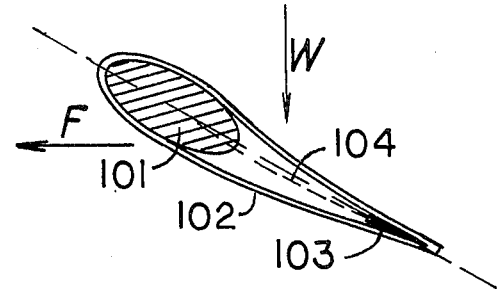
FIG. 6.
FIG. 7.
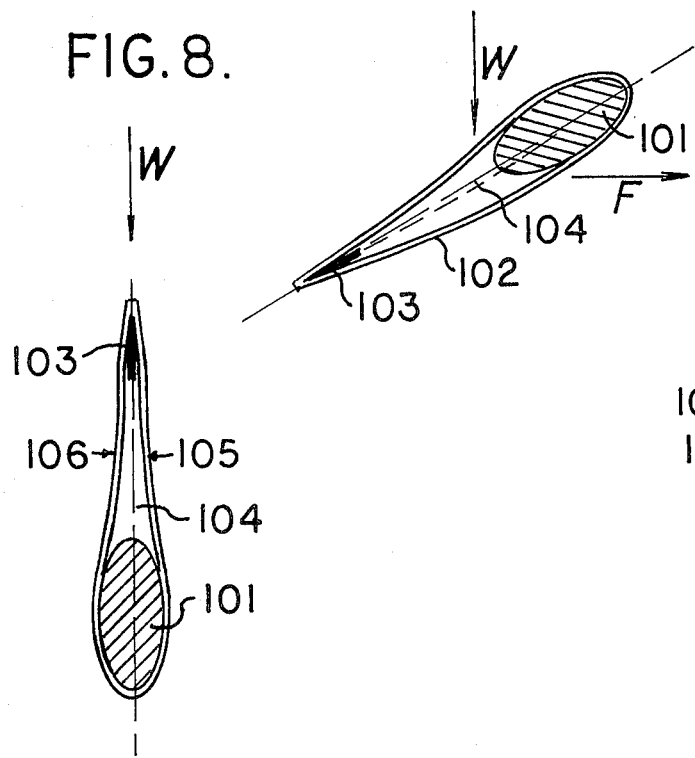
FIG. 8.
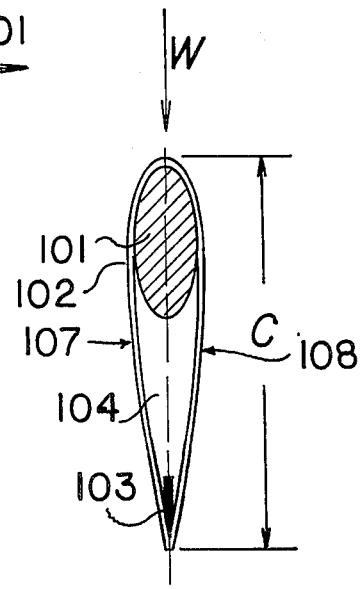
FIG. 9.

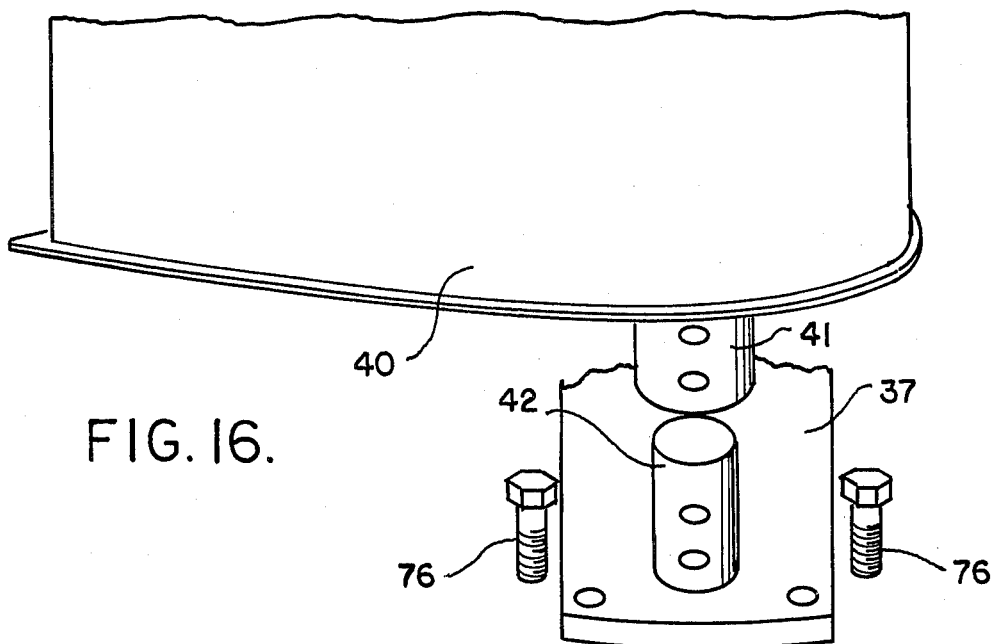
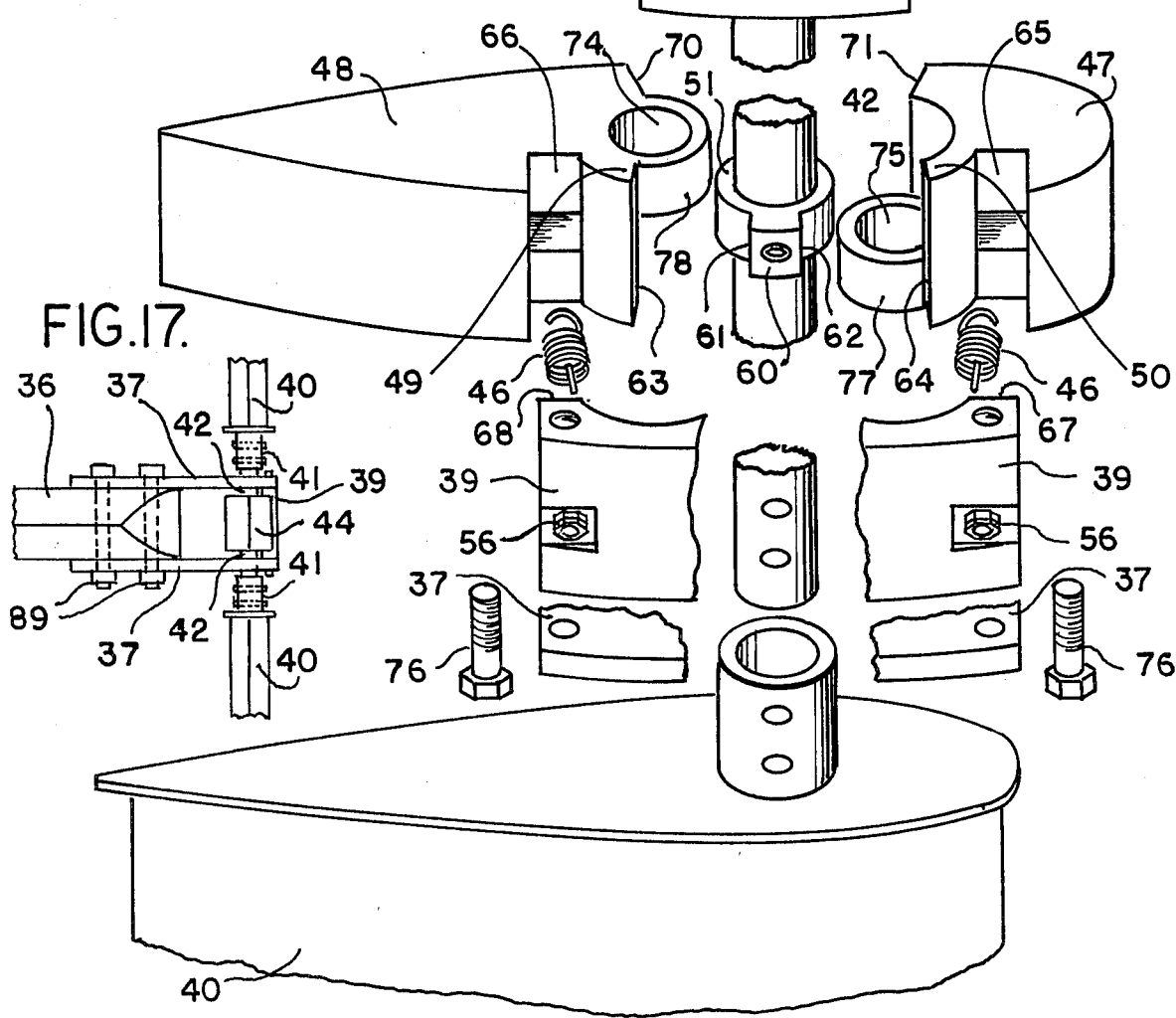

VERTICAL AXIS WIND TURBINE

BACKGROUND OF THE INVENTION

This invention relates to wind machines for converting wind energy to perform useful work, generally called windmills. Windmills extract power from a wind current by use of blades mounted to a rotatable structure to turn a shaft. The mass of a wind current impinging upon the blade, and flowing around it, transmits a force to the blade which is transformed into a torque about the drive shaft on which the blades rotate to power pumps, generators, compressors, or the like.

Various designs have been conceived for windmills. Some have used propeller-like blades connected to a hub which rotates on a horizontal shaft directed generally parallel to the wind flow. Machines of this type are commonly found on farms to power pumps, or the like, at remote locations. It is necessary to orient the orbiting blades perpendicular to the direction of the wind for this type of windmill, in order to properly expose them to the wind current so they will generate a rotational force. This directional sensitivity reduces the efficiency of these type windmills in any area having unstable gusting wind currents. It also requires that a steering mechanism be used to position the blades. Further, in recent years, structural difficulties have been found in making these machines of a sufficiently large size to produce the power necessary to meet current needs, especially for electricity generation. These difficulties arise not only from the type and height of a structure necessary to position the blades in an adequate wind flow, but also from the high centrifugal forces to which the rotating blades are subjected.

Other designs have a number of blades circularly mounted about a rotatable structure in carousel fashion. The structure includes a shaft positioned with its axis generally parallel to the axis of the blades, and perpendicularly positioned with the wind flow. These type machines, commonly referred to as cross-wind axis wind turbines, are usually installed with the blades and shaft positioned vertically with the ground surface. In this configuration the blade surfaces are exposed to wind currents blowing from any direction, making them capable of capturing energy with instantaneous response from directionally changing winds, without need of a steering device sensitive to wind direction. Further, due to the vertical position of the rotating shaft it is unnecessary to mount a driven implement or a right angle drive, such as a gear box, at a high elevation on the supporting structure of the windmill.

A blade of a wind machine obtains power from the wind by slowing the free stream wind speed downstream of the blade. In the design of windmills, or wind turbines, two principle motive forces can be generated from this wind speed change to provide torque about the rotating shaft. The first is a drag force acting on the blades which is caused by the wind current impinging on the surface of the blade. The drag force is created by the transfer of kinetic energy of the moving wind mass to the blade as the wind current is slowed by contacts with the surface of the blade as the wind flows around its form. Drag type wind machines are self-starting and generally produce high torque from their starting mode through low rotational speeds.

A drag-type wind machine, however, has inherent limitations. The tip speed of the rotating blade cannot be faster than the speed of the wind and usually it is somewhat less. This characteristic limits the rotational velocity of the shaft to which the blades are affixed, and it may require a transmission to obtain the shaft speed required for performing the desired work.

The ratio of the blade tip speed to the wind speed is commonly known as the tip speed ratio. This value is used as a measure of the functional range of efficient operation of the wind machine. Generally, a drag-type machine will produce optimum power when the tip speed of its blades approaches that of the free stream wind speed, meaning the tip speed ratio is close to one. However, a limit of the maximum tip speed attainable is also a limit to the amount of power which can be produced. A drag-type wind machine, being limited to a maximum ideal tip speed ratio of one, is thereby limited in its capability to produce power and in its efficiency. The maximum efficiency obtainable with the drag-type wind machine is a moderate value of about 30%, usually something less.

The second motive force employed to propel a wind machine is a lift force generated as wind current flows past an air foil. This type of wind machine uses a blade formed in the shape of an air foil positioned so that the lift forces generated by the wind current flowing over the blade will act in a direction to move the blade in its orbit. A component of the lift force in the direction of rotation is applied through a rotor structure to the rotating shaft to create a torque about the shaft.

Lift-type wind turbines are known to have blade velocities much higher than that of the free-stream wind speed. They therefore have tip speed ratios in excess of one, and often in the range of four to six. This is because blade speed is not directly dependent on a wind velocity component, but rather on a lift force component. Generally, the higher the tip speed ratio the more efficient the operation of the wind machine to produce power. The very high rotational speeds of lift-type wind machines adapt them for use with accessories that require high speeds, such as generators. The high rotational speeds also provide for a higher degree of efficiency and greater power production.

Generally, lift-type machine efficiencies are found in a range of 35 to 45%. Tip speed ratios may range from less than 1, as is common for the typical farm-type windmill, to between 4 and 6, as is common for vertical axis-type wind turbines as invented by G. J. M. Darrieus and described in U.S. Pat. No. 1,835,018.

The tip speed ratio is a critcal parameter of the lift-type machine, especially the Darrieus type wind turbines. Because a value curve of efficiency versus tip speed ratio for this type machine is highly peaked, a small change in the wind speed can result in a large change in efficiency, and a resultant loss of available power. This effect can be so severe as to cause the rotor to stop turning altogether. This so-called stall of the wind turbine may result from changes in the tip speed ratio due to wind gusts, i.e. an increase in wind velocity, as well as changes in the tip speed ratio from wind stagnation. Surmounting this characteristic normally requires a control system to vary the load placed on the turbine, or to vary the blade pitch angles more directly toward their relative wind flow, to prevent the machine from completely stopping.

Additionally, because of their narrow range of efficient operation, some common lift-type wind machine designs will not self-start, requiring a power input to the driven shaft to initiate rotation and bring the speed of the turbine up to a tip speed ratio of self-sufficient operation. This inability to begin rotation and accelerate to an efficient rotational speed is severe with the Darrieus lift-type (crosswind axis) wind turbine. It has given rise to auxiliary methods for self-starting which include the addition of external power sources apart from wind energy and the addition of drag-type blade forms mounted with the lift-type blades to the rotor structure to initiate rotation, as is described in the Bolie U.S. Pat. No. 4,204,805.

An increasingly common method of self-starting a Darrieus type wind turbine is the use of variable pitch blades on the rotor which are articulated to change their pitch angle with reference to the relative wind current as they travel around their carousel-shaped path. Blade articulation increases the total efficiency of the wind turbine by providing maximized lift force on the blades for a greater period throughout their orbital cycle. The blades are typically hinged on their longitudinal axis parallel to the axis of the driven rotating shaft so that they may be pivoted.

Various designs have been conceived for achieving pivotal movement of the turbine blades. Kinematic mechanisms have been used as was early shown in the Darrieus patent, and as is described in the Drees patent, U.S. Pat. No. 4,180,367. Drees further teaches the use of a gravitational force acting on a blade to pivot it perpendicularly to the wind between 90° stops on one side of the turbine, while the turbine is at rest and at slow speeds. The wind creates a drag force on the perpendicularly positioned blade to begin and sustain rotation. Centrifugal force acting on the mass of the blade increases as the turbine speed increases to pull the blade into a tangential position with its orbit where it generates lift force.

Centrifugal force generated on a blade in its orbital movement has also been used as a means for positioning a blade. U.S. Pat. No. 4,048,947, Sicard shows a method of positioning a blade using centrifugal force where a weight is rigidly attached to a blade and extended obliquely outward therefrom to change the center of mass of the blade respond which the centrifugal force acts, thereby controlling the pitch angle of the blade as turbine speed increases.

Oscillatory pivotal motions of the blade have been employed which are effected by the wind current impacting on the surface of the blade, to direct the blade pitch angle to a more favorable position. The pivotal movement of the blade is generally controlled by a biasing means, such as a spring, which urges the blade into a tangential position with its orbit. The biasing means allows the blade to position itself in a state of balance between the force exerted on it in deflecting the wind current and the tension exerted on it by the biasing means. This type of control has been used to provide for self-starting the turbine, as well as maximizing its efficiency at a specific rotational speed and to limit the maximum rotational speed of the turbine by angular positioning of the blades, as is described in the U.S. patent of Rumsey, No. 4,052,134 and the Canadian patent of Cameron, No. 1,045,038.

Past designs have succeeded in providing a self-starting capability for lift-type wind turbines. They have further been able to provide articulating blade features which enhance efficiency and power at a specific turbine rotational speed, and which can limit the turbines maximum rotational speed to prevent damage from centrifugal forces in an over-speed condition. However, none of the previous designs have provided a wind turbine which is capable of self-starting while being highly efficient throughout its entire operational speed range.

SUMMARY OF THE INVENTION

The present invention is a vertical axis wind turbine, which is capable of self-starting and accelerating to a high rotational speed for maximum power production and self-sustaining operation. This wind turbine is further capable of providing efficient power production throughout a large range of tip speed ratios, overcoming the limitations inherent in prior designs which have narrow efficiency bands and speed ranges. It is capable of efficient operation in wind current velocities ranging from 5 to 40 miles per hour, providing good torque to the drive shaft at low rotational speeds of the turbine. The efficient operation of this turbine in low to very high wind velocities permits a user to take advantage of most of the usable annual wind spectrum of a typical installation site, where 90% of the annually available wind energy is found in wind currents between 10 and 40 miles per hour, half of this energy being available in winds of less than 20 miles per hour.

This inventive wind turbine provides a simple structure which is economical to erect. It is preferred in a vertical axis configuration to provide instantaneous response to changing wind directions. It is also preferred that the turbine be provided with two blade forms yielding a low solidity ratio, i.e., the ratio of the blade area to the wind stream swept area, for additional benefits. Having fewer blades incorporated in the wind turbine reduces its cost of manufacture. More importantly, a reduced solidity ratio of the turbine permits operation at higher rotational speeds so that a transmission is not required to drive implements needing high speed inputs. Higher speed capability yields a higher tip speed ratio, as was previously discussed, which in turn gives increased efficiency and greater power production, these values more nearly approaching ideal parameters. A low solidity ratio further provides for light weight of the turbine structure which, due to reduced inertia, will be much more responsive to wind gusts and able to accelerate quickly. The increased response of this invention is particularly beneficial because of the broad efficiency and power range it has provided by its design.

Though low solidity ratios are normally associated with low efficiencies, low torque in low rotational speed ranges and an inability of the turbine to self-start, these problems are overcome by this inventive turbine through the combination in its design of known elements for efficient operation with a novel torque sensitive control means for directing the blade forms in a wind current.

The wind turbine comprises a lightweight aerodynamically-shaped rotor structure rotatably mounted to a supporting structure. Blade forms are pivotally attached to the outer ends of the rotor for motion in an orbital path. When the rotor is at rest, the blade forms are capable of pivotal movement effected by the force of a wind current flowing against the side surfaces to a position in which the wind current flowing past the blade forms will generate sufficient lift force to begin rotation of the turbine. The pivotal movement of the blade forms is initially restrained by a biasing means which limits their oscillatory motion as they progress around their orbital path to a pitch angle which maximizes the forces generated by the blade forms at low rotational speeds.

As rotational speed of the turbine increases, a torque sensitive control independent of the blade forms acts to progressively limit their pivotal movement in response to forces exerted against them by the wind current, to determine a pitch angle of the blade forms with this relative wind which maximizes the forces generated by them. For operation of the wind turbine in a constant velocity wind, the torque control will progressively act as turbine speed increases to compliantly position the blade forms in a preferred tangential position for maximally efficient high speed operation. The inventive torque sensitive control provides for selection of controls to adjust the performance charactristics of the wind turbine to properly match the load of the implement it drives.

DESCRIPTION OF THE DRAWINGS

FIG. 5 is a central cross-sectional view of the deformable blade form in zero velocity wind current.

FIG. 6 is a cross-sectional view of a deformable blade form showing an exaggerated representation of surface deformation when wind current flows against its side.

FIG. 7 is a cross-sectional view of a deformable blade form showing an exaggerated representation of a surface deformation when wind currents flow against its other side.

FIG. 8 is a cross-sectional view of a deformable blade form which shows an exaggerated representation of surface deformation when wind current flows past from a rearward direction.

FIG. 9 is a cross-sectional view of a deformable blade form which represents the surface shape when wind current flows past it from a forward direction.

FIG. 16 is an exploded view of the preferred embodiment of the torque sensitve control, and of the pivotal mounting of a blade form.

FIG. 17 is a lateral view relative to a rotor depicting the pivotal mounting of a blade form and of a torque sensitive control on the center end of a rotor.

DETAILED DESCRIPTION OF THE INVENTION

Figure 1:
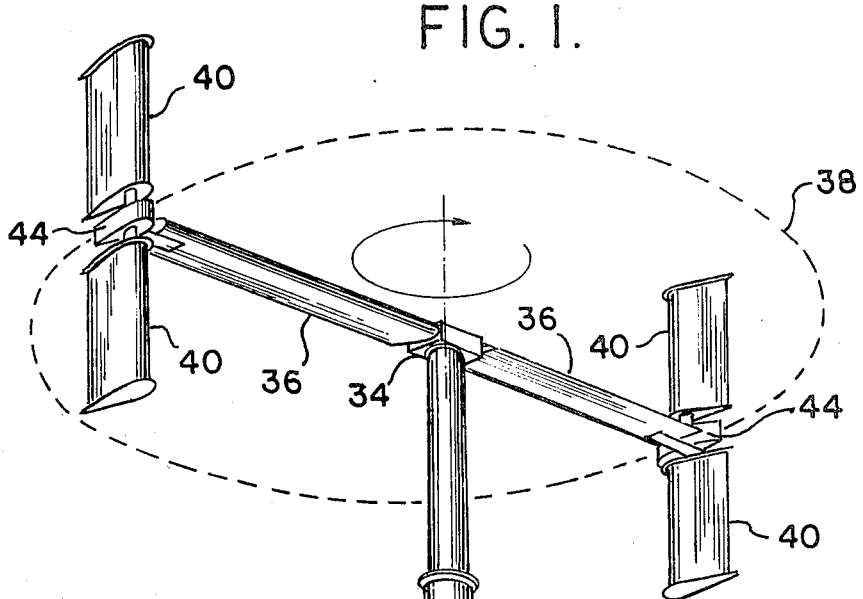
FIG. 1 is a perspective view of a vertical crosswind axis wind turbine embodying the features of this invention.
Figure 2:
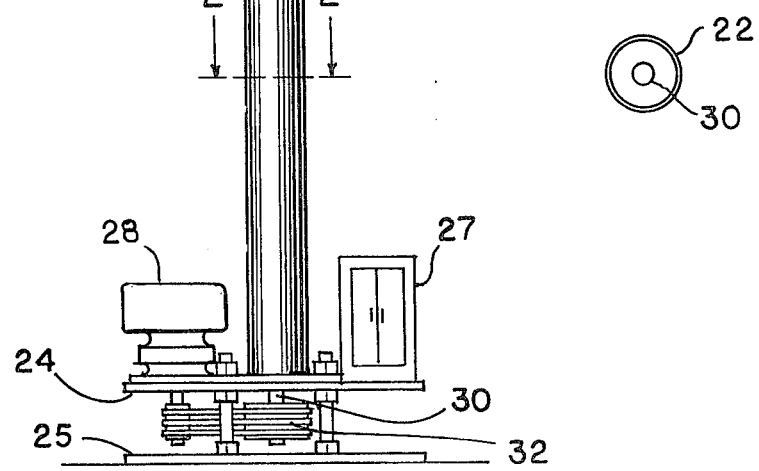
FIG. 2 is a cross-sectional view of the support structure taken generally along lines 2—2 of FIG. 1.
Figure 3:
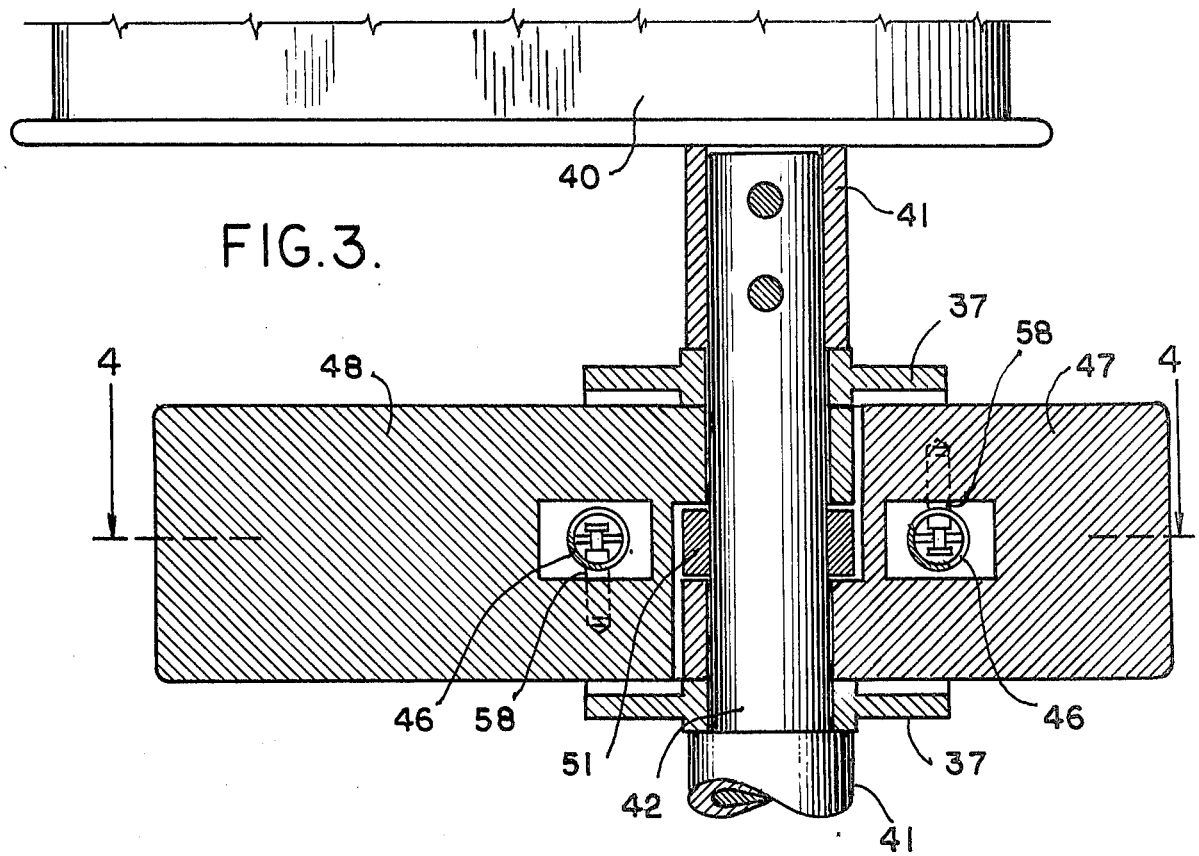
FIG. 3 is an enlarged partial vertical sectional view of the torque sensitive means for controlling the pivotal movement of the blade form as seen looking toward the central axis of the wind turbine.

Referring first to FIG. 1, a vertical axis wind turbine 10 is shown comprising a support structure 20 having a tubular frame 22 which is connected to a base 24. The base 24 is fastened to a suitable foundation 25 and provides a mounting position for control apparatus 27 and for driven implements 28. A shaft 30 is positioned longitudinally within the tubular frame 22. The shaft 30 is supported for rotational movement about a longitudinal axis, by bearing structures (not shown) positioned at top and bottom portions of the frame 22. A drive assembly 32 is provided at a lower end of the shaft to transfer power from the rotating shaft 30 to a driven implement 28 mounted on the base 24. At an upper end the shaft 30 is connected a hub 34, to which a pair of aerodynamically shaped rotors 36 are mounted for rotational movement. The rotors 36 are positioned perpendicularly to the axis of the shaft 30, and the tubular frame 22, and are of equal length, so that their distal ends define an orbital path 38 at the top of the support structure 20.

Blade forms 40 are mounted to the outer ends of the rotor 36 for limited pivotal movement with the rotor 36. As a wind current flows past the wind turbine 10, aerodynamic lift forces and drag forces are generated by the blade forms 40. The turbine is able to self-start from rest by the ability of the blade forms 40 to pivot into a favorable pitch angle with the wind current and thereby generate force. These generated forces create a torque about the shaft 30 through the rotor arms 36, to accelerate rotation of the turbine to produce power. Power is transferred through the shaft 30 to the implement 28 which the turbine drives.

The pivotal movement of the blade forms 40 is controlled by a torque sensitive control 44 positioned on the pivotal connection of the blade form 40 with the end of the rotor 36. The torque sensitive control 44 adjusts the position of the blade forms 40 relative to the rotor 36 so that they will provide high torque about shaft 30 throughout the operational range of the turbine.

The pivotal connection of the blade forms 40 to the rotor 36 is shown in FIGS. 16 and 17. A pair of mounting plates 37 are connected to the outer ends of the rotor 36 by bolts 89, and extend outwardly to provide a bifurcated end 43 of the rotor 36. An end cap 39 is positioned between the distal ends of the mounting plates 37 for their support. The end cap 39 is held in place by fasteners 76. The blade forms 40 are pivotally mounted to the outer end of the rotor 36 by a hinge pin 42 which is positioned vertically through the bifurcated end 43 of the rotor. A mounting member 41 extending longitudinally from a forward portion of each blade form 40 is positioned over the ends of the hinge pin 42 and connected thereto by fasteners, such as rivets 45, to hold the blade forms 40 in a substantially vertical position on the ends of the rotor 36. The blade forms 40 are thus positioned to rotate along the oribital path 38 defined by the ends of the rotors 36.

Figure 14:
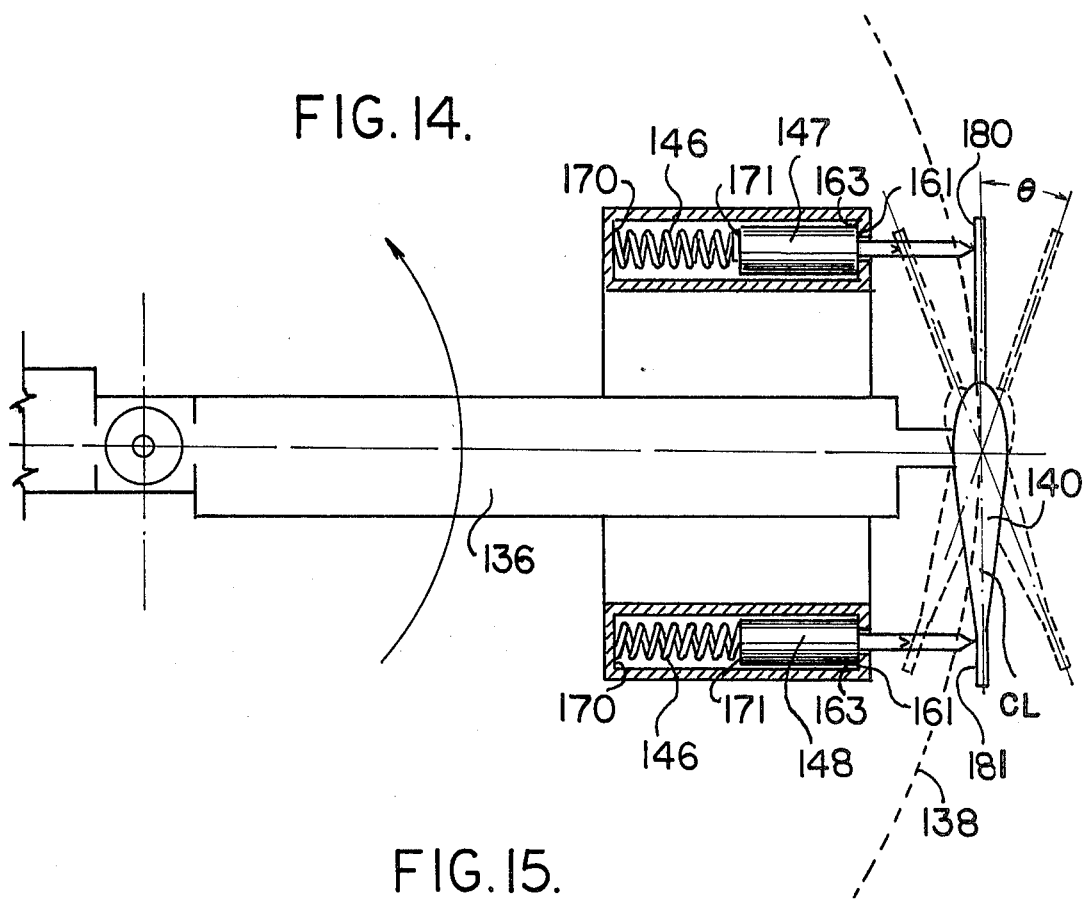
FIG. 14 is a diagrammatic representation of the torque sensitive pivotable control for the blade form representing the principles of its design.

FIG. 14 depicts a model diagramatically illustrating the components acting on the blade forms 40 to control their pivotal movement. FIG. 14 further illustrates the functional operation of the torque sensitive control 44 as comprised in the turbine. A blade 140 is shown pivotally mounted to an end of the rotor 136, pivotable about axis P longitudinally through a forward portion of the blade 140, which is concentric with a hinge pin (not shown) on which it is mounted. The blade 140 is urged into tangential position, i.e., a position in which the chord line CL of the blade form 140 is generally parallel with a tangent to its orbit 138 as defined by rotor 136, by a pair of springs 146 which cooperate with the torque sensitive control. Springs 146 are positioned to urge the blade form 140 to a tangential position by applying an outward force to the blade 140 at a forward lever arm 180 and a rearward lever arm 181. The blade 140 is adapted to pivot about the forward axis P when sufficient force is directed against either of its sides by a wind current, to overcome the force exerted by either of the springs 146 on the forward or rearward lever arms 180 or 181 of the blade 140. The pivotal displacement angle through which the blade 140 moves when the turbine is at rest is determined by a balance of the forces exerted by the springs 146 with the forces exerted against the side of the blade 140 by the wind. Increasing angular displacement of a blade 140 moves a spring 146 from its unstressed length to increase the force it applies. The pivotal movement of the blade 140 continues until the force exerted by the spring is sufficiently increased to balance the force exerted by the wind, thereby balancing forces applied to the blade 140 and ceasing its pivotal movement. A spring 146 may be selected having a coefficient to provide a desired transitional movement of the blade 140.

By allowing the blade 140 to pivot when the turbine is stationary with the blade form 140 positioned in a wind flow, the force of the wind against the side of the blade 140 will pivotally direct the blade 140 into a favorable pitch angle with the free-stream wind flow to generate maximum force and initiate rotation of the turbine. The ability of the blade 140 to pivot yields greater total force in the direction of rotation of the turbine from standstill through low rotational velocities, and therefore generates torque about the driven shaft in an extended operational range to increase efficiency of the turbine.

A forward and a rearward weight, 147 and 148, respectively, are each positioned to apply a force on the blade 140, in addition to the forces exerted by the springs 146, as centrifugal forces act on the weights 147 and 148 when the turbine increases rotational speed. The centrifugal forces acting on weights 147 and 148 are applied to the blade form 140 through lever arms 180 and 181, which are positioned perpendicularly with the outward direction in which these forces act, to obtain maximal benefit of their effect. Each of the weights 147 and 148 is provided with a contact surface 161 which engages a frame element 163 to limit their outward movement, thereby positioning the blade 140 in a tangential position when both of the weights 147 and 148 are extended to their fullest reach. Because of the limits on outward movement of the weights 147 and 148, the blade 140 only coacts with either the forward or the rearward spring and weight, 146 and 147 or 146 and 148, without the other, to pivotally move from a tangential position by force of a wind current against its side.

The maximum angle $\theta$ through which the blade may pivot is limited by engagement of a second contact surface 171 on each weight 147 and 148, which engages a second frame element 170. A maximum pivotal angle $\theta$ through which the blade 140 may pivot, may be selected to provide for optimum performance, and is preferably limited to 30° on either side of a tangent with the blade orbit 138. The maximum pivotal movements of the blade 140 on either side of its tangential position need not be equal, as application of the turbine may require.

The centrifugal forces applied to the blade 140 by the weights 147 and 148, increase as the turbine speed increases. When the summation of the spring forces and the centrifugal forces exerted on the blade 140, balance the force applied to the side of the blade 140 by the wind, the blade 140 is prohibited from further pivotal movement. The domination of these summed forces at high turbine speeds maintains an engagement of the contact surfaces 161 of the weights 147 and 148 with the frame element 163 to firmly position the blade 140 in a selected position substantially tangential with its orbit 138.

The weights 147 and 148 are preferably comprised of the same mass. Also, the forward lever arm 180 and the rearward lever arm 181 of the blade 140 at which the forces are exerted by the springs 146 and the weights 147 and 148, are preferably equal lengths from the pivotal axis P of the blade 140. However, the mass of the weights, and the length of the lever arms 180 and 181 through which their forces act, may be selected to provide a tailored constraint on the pivotal movement of the blade 140 to satisfy specific power requirements of an implement which the turbine drives, or to take advantage of wind conditions in which the tubine must perform.

Figure 10:
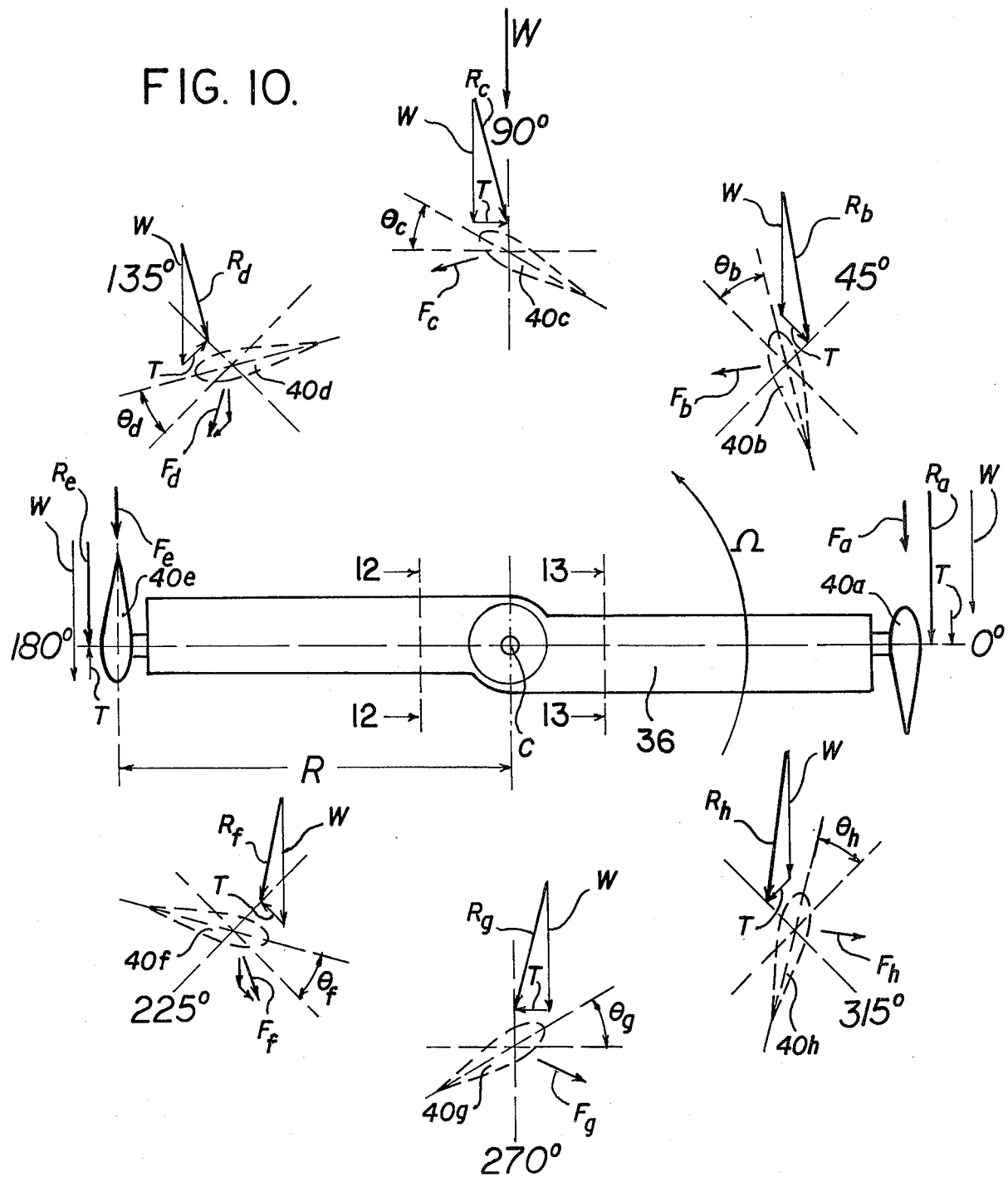
FIG. 10 is a diagramatic plan view of the wind turbine blade forms showing resultant blade pitch angle positioning of this invention and the resultant aerodynamic forces generated at low rotational velocities, specifically a tip speed ratio of less than 0.5.

The pivotal movement of a blade form at standstill and at low rotational speeds of the turbine is shown in FIG. 10 for various positions of the blade in its orbit. The illustrations show the pivotal displacement of the blades effected by a wind current W flowing, as shown, from top to bottom of the page. In a zero degree orbital position, a blade form 40a is positioned parallel to and directed into the wind flow W. Since the blade form 40a is directed head-on into the wind flow, the wind force component exerted against its two sides is equal and the wind does not tend to pivot the blade. The blade form 40a therefore remains in tangential position as urged by springs 146 of FIG. 14. A slight drag force $F_a$ acts on the blade form 40a opposing rotation of the turbine 10 by the wind flowing head-on against the blade. The aerodynamic shape of the blade form 40a minimizes the drag force acting on the blade in this position.

Where a blade form 40b is in a 45° position of its orbit, the wind flow W exerts a force against the outer side of the blade to pivotally displace the blade form 40b through an angle $\theta_b$ directed outwardly of its tangent position. The angle $\theta_b$ is determined by a balance of the force of the wind and of the spring 146 (of FIG. 14) acting on the blade 40b, as described supra. In this pivotal position the blade 40b obtains a pitch angle with the wind current W to generate a lift force $F_b$ having a component in the direction of rotation of the rotor 36, to initiate rotation of and accelerate the turbine 10.

Where a blade form 40c is in a 90° position of its orbit, the outer side of the blade form is exposed perpendicularly to the wind flow when the blade 40c is in a tangential position with its orbit 38. In this position, the wind flow exerts a large force against the outer surface of the blade form pivotally displacing the blade to an angle $\theta_c$. The angle $\theta_c$ is generally a maximum pivotal position for the blade form 40*c*. In this position, the blade form 40*c* obtains a favorable pitch angle with the wind current W to generate a large lift force $F_c$ having a component in the direction of rotation of the turbine rotor 36.

A blade form 40*d* in a 135° position of its orbit is also maximally pivoted through an angle $\theta_d$, which therefore equal angle $\theta_c$. In this pivoted position, the blade form 40*d* has substantially exposed its outer surface perpendicularly to the wind flow. The blade form will thus generate a drag force parallel to the wind flow and a lift force component, to provide resultant force $F_c$ having a component in the direction of rotation of the turbine.

In the 180° orbital position a blade form 40*e* is positioned parallel with the wind current W and directed away from the wind. Since each side of the blade form 40*e* is exposed equally to the wind current W, the blade form 40*e* will maintain a tangential position as urged by the springs 146 (of FIG. 14). The blade form 40*e* in this position will produce a drag force component $F_e$, which is enhanced by the deformable character of the blade form, as will be discussed infra. The drag force component generated by the blade form 40*e* in this position is larger than the drag force component acting against rotation of the turbine on blade form 40*a* in the zero degree position, thereby providing a resultant force in a direction to accelerate rotation of the turbine.

A blade form 40*f* in a 225° position of its orbit exposes an inner side of the blade to the wind current W. The force of the wind W on the inner side of the blade form 40*f* maximally displaces the blade an angle $\theta_f$ directed inwardly of its tangential position, the angle $\theta_f$ equaling angles $\theta_d$ and $\theta_c$ though on the opposite side of the tangent of orbit 38. The blade form 40*f* is angularly displaced a maximum amount as limited by the torque sensitive control 44 and substantially exposes its inner side perpendicularly with the wind flow W. In this position the blade produces a drag force parallel to the wind flow W and a lift force component, having a resultant force $F_f$ with a component in the direction of rotation of the turbine.

In a 270° position of its orbit, a blade form 40*g* maintains a maximally pivoted position through angle $\theta_g$. Angle $\theta_g$ therefore equals angle $\theta_f$. The blade form 40*g* has obtained a favorable pitch angle with the wind flow W to generate a large lift force $F_g$ in a direction to accelerate rotation of the turbine. Absent the pivotal movement of the blade form 40*g* in this position, its surface would be positioned noraml to the wind current W unable to produce any lift force, as is also true for blade form 40*c* in a 90° orbital position.

In a 315° orbital position, a blade form 40*h* is pivotally displaced an angle $\theta_h$, which is determined by a balance of forces of the wind and of the springs 146 (of FIG. 14) acting on the blade form. In this position, the blade form 40*h* assumes a favorable pitch angle with the wind current to produce a lift force $F_h$ having a component in a direction to accelerate rotation of the turbine. The angle $\theta_h$ is generally less than the maximum pivotal displacement of which the blade 40 is capable.

For low speeds of the turbine 10, as a blade form 40 progresses through its full orbit, it will begin in tangential position, e.g. as shown in the zero degree orbit position. Rotation in the direction is initiated by the greater drag force $F_e$ on the 180° position blade than the drag force $F_a$ in the zero degree position blade form. As the blade form 40 progresses toward a 45° orbit position, it will initiate an outwadly directed pivotal displacement to obtain a favorable pitch angle with the wind flow W for generation of maximized lift force. The pivotal position of the blade 40 is determined by a balance of the forces acting on it, as previously discussed, and is continually changing as the blade progresses. The pivotal movement of the blade form 40 will reach a maximum as limited by the torque sensitive control 44 before it reaches the 90° position of its orbit, and will remain in a maximally pivoted position by force of the wind current W against its outer side until the blade form 40 approaches the 180° orbit position. At this point the blade form 40 will quickly return to a tangential position with its orbit 38 as urged by the springs 146 (of FIG. 14), when its side is relieved from the force of the wind flow W. As the blade form 40 continues through the 180° orbit position, it will maximally pivot to an opposite maximum pivotal displacement immediately after it leaves the 180° orbital position as the force of the wind is direct against its inward side. The blade form 40 will remain in this maximum pivotal position through its orbit until it passes a 270° orbit position, at which point it will gradually decrease its pivotal position in response to a decreased force of the wind against its side. The blade will obtain a favorable pitch angle with the wind W to generate maximum lift force through its rotation from the 270° orbital position to the zero degree orbital position in response to a balance of the forces exerted on the blade. The pivotal displacement of the blade will gradually decrease as it approaches a zero degree orbit position until the blade is again in tangential position head-on into the wind.

Each blade will, therefore, effectively oscillate between equal but opposite pivotal positions, inwardly and outwardly of a tangent of its orbit as it progresses through a full revolution. From the forces $F_a$ through $F_g$ depicted in FIG. 10, it can be seen that, due to the pivotal capability of the blade form, a component of force in the direction of rotation of the turbine is generated by the blade form in every position throughout its orbit, except when it is moving head-on into the wind. Therefore, for any position in which a two-bladed rotor 36 may stop, a force adequate to initiate rotation can be generated by a wind flow. At low rotational speed, a positive force is generated by at least one blade 40 in a direction to accelerate rotation of the tubine 10, throughout the orbital path 38 of the blade forms 40, thereby providing high torque to the driven shaft and a substantial increase in low speed efficiency.

Once the turbine 10 begins rotation, as the rotor 36 accelerates, the increasing tangential velocity of a blade form 40 has effect on the direction and velocity of the wind flow which the blade form 40 realizes. Referring to the Vector diagrams for low turbine speeds depicted in FIG. 10, a relative wind current R is the approximate resultant of the free-stream wind flow W and the tip speed of the turbine rotor T (which is the same as the blade form tangential velocity). A change in either the wind flow W or the tip speed T results in a change in magnitude and direction of the relative wind current R. Generally, until the tip speed T equals the wind speed W, as the tip speed T of the rotor increases, the relative wind current R increases on the upstream side of the turbine and decreases on the downstream side of the turbine.

At low turbine speeds, the blade forms 40 adapt to changes in the magnitude and direction of the relative current R by obtaining a pivotal position of balance between the force of the wind R against their sides and the resisting force of their springs 146 (of FIG. 14) urging them to a tangential position, thereby obtaining a favorable pitch angle with the relative wind R to generate maximum rotational force for their relative position in orbit.

As can be seen from the vector diagrams of FIG. 10, for low speeds of the turbine, the relative wind R decreases in magnitude as a blade form 40a moves from its zero degree orbital position to a 90° orbital position, as shown by blade form 40c. The direction of the relative wind R changes from a head-on position as shown by $R_a$ to an oblique position with the blade form 40 as depicted by $R_c$, thereby applying a force to the side of the blade 40c to pivotally displace it. The pivotal displacement of the blades 40b and 40c to a more favorable pitch angle with the relative wind flow, $R_b$ and $R_c$ respectively, provides for maximum lift force generation by the blade form.

As the blade form 40c progresses towards a 180° position of its orbit, the relative wind R decreases in magnitude and directionally positions itself perpendicular with the side of the blade form as shown in the position of 135° for blade form 40d. As the blade form obtains a 180° position shown by blade form 40e, the relative wind current has decreased to a minimal magnitude and is flowing past the blade form 40e back to front.

The ability of the blade form to react by pivotally positioning itself in a favorable pitch angle with the relative wind current R as described, provides for increased torque production by the wind turbine at low rotational speeds. The blade form 40 will similarly react to changes in the relative wind vector as it progresses through its second 180° of orbital rotation and returns to the zero degree position of its orbit.

As the tip speed T of the rotor 36 becomes greater than the wind speed W, the resultant wind current R becomes more dominated by the tip speed T throughout the orbital path 38. The direction of the relative wind R approaches a tangent of the orbital path 38 as high rotational speeds of the turbine are reached.

Figure 11:
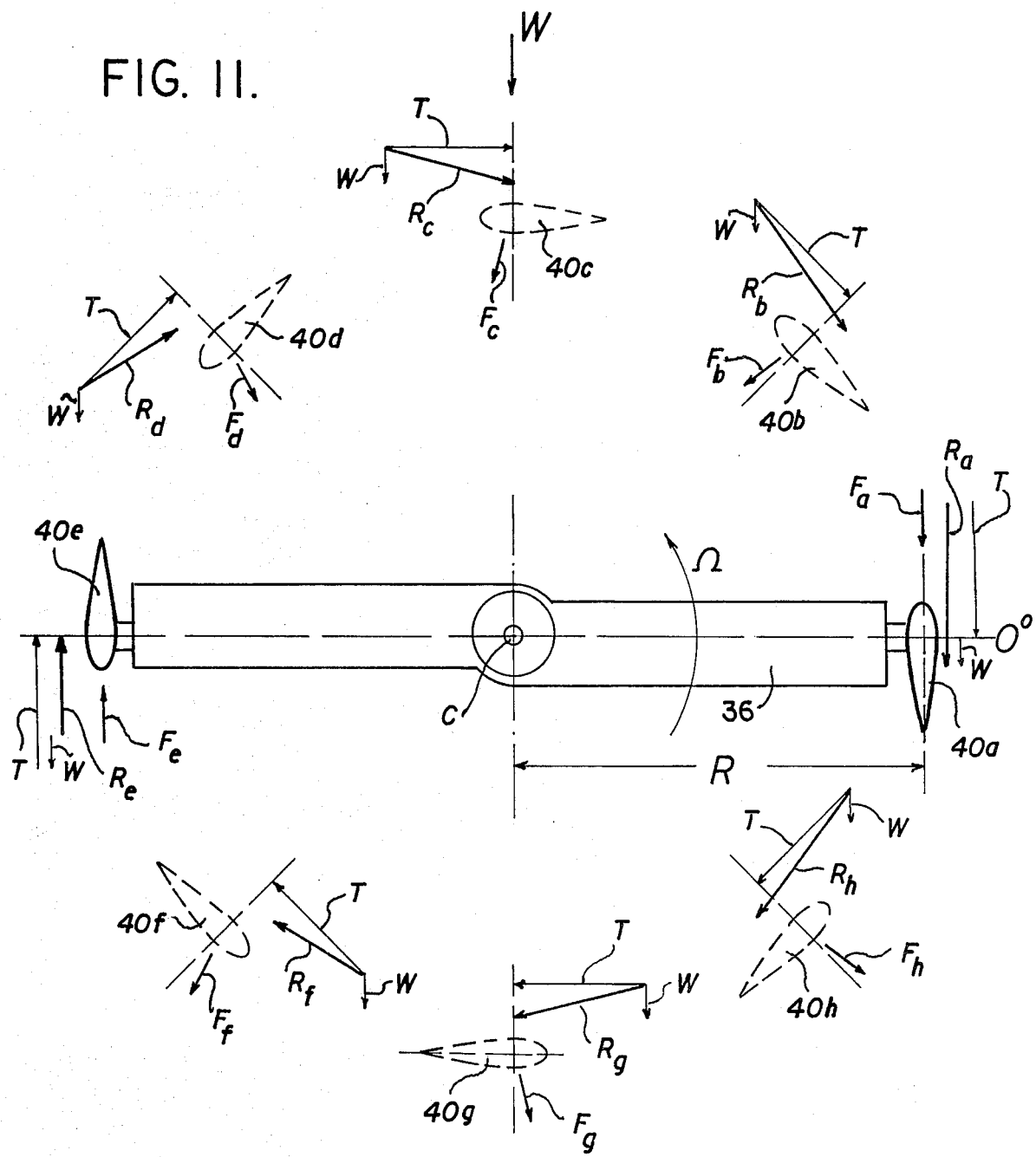
FIG. 11 is a diagramatic plan view of the wind turbine blade forms showing the resultant pitch angle positioning of this invention and the resultant aerodynamic forces generated at high rotational velocities, specifically at tip speed ratios of four or greater.

Illustration of this change in the relative wind current R is shown in the vector diagrams of FIG. 11 for a tip speed ratio of 4, i.e. where the tip speed T is four times greater than the wind speed W. A similar resultant wind current $R_a$ through $R_h$ is present in each of the orbital positions of the blade. A blade form 40a in the zero degree orbital position is exposed head-on to a relative wind current R, which is the resultant of the speed of the wind current W and the tip speed T of the blade form 40a. As the blade form progresses toward the 90° orbital position, the resultant wind R become obliquely situated from a head-on position and decrease in magnitude by a very small amount. Thus, as shown for the blade form 40c the resultant wind R approaches the blade obliquely from its outward side by a small angle, and is of a very large magnitude, greater than four times the speed of the wind current W. As the blade form progresses toward the 180° orbital position, the relative wind current R again becomes head-on to the blade and is of its smallest magnitude, which yet remains a large multiple of the speed of the wind current W.

Each of the relative wind currents $R_a$ through $R_h$ depicted in FIG. 11 approaches the blade form 40A from a generally head-on position throughout the blades' orbit, changes in direction being a slightly oblique positioning of the relative wind R with reference to the blade form 40. Though a change in the magnitude of the relative wind R is evident, the relative wind remains many times greater than the speed of the wind current W for all orbital positions of the blade form 40. In orbital positions where the relative wind current approaches the blade from a slightly oblique position, a lift force is generated perpendicular to the relative wind current direction, as is depicted by the forces $F_b$ through $F_d$ and $F_f$ through $F_h$. Only in the zero and 180° positions, where the relative wind current approaches the blade directly head-on, is no lift force generated. In these positions a drag force represented by $F_a$ and $F_e$ is present due to the wind flow against the front of the blade.

At high speeds, it is no longer necessary to pivot the blade form 40 to obtain a beneficial pitch angle of the blade with the wind flow W for production of lift force. A relative wind flow R approaches the front of the blade form 40 in a satisfactory direction to produce lift force throughout its orbit due to the additive effect of the high tip speed T and the relatively lower free-stream wind flow W. Since a lift force F is produced by the blade form 40 in every position of its orbit, except where it is directly head-on or directly tail-on to the wind flow W, a force component is generated in the direction of rotation substantially throughout the blade orbit. The blade forms therefore provided a force for production of torque about the shaft in all but a very small portion of their orbit, thereby providing for efficient power production of the wind turbine.

The torque sensitive control 44 of this turbine provides for these operational parameters by acting to progressively limit the pivotal movement of a blade form 40 as the relative wind current direction changes toward a slightly oblique head-on position characteristic of high turbine speeds, thereby maintaining a maximally beneficial pitch angle of the blade form 40 with the relative wind current R. For a constant free-stream wind flow, as the turbine speed increases the increase in centrifugal force on the weights 147, 148 (of FIG. 14) causes the torque sensitive control 44 to progressively limit the pivotal movement of the blade form 40 in accordance with selected operational characteristics, until a sufficiently high speed is reached at which point the centrifugal force is large enough relative to the wind force that the torque control firmly holds the blade 40 in a substantially non-pivotal position.

The blade forms 40a through 40h of FIG. 11 are shown in a restricted pivotal position which is generally tangent with their orbit 38, as maintained by the torque control 44 at high rotational speeds of the turbine. Each of the forces generated in the depicted orbital positions, other than zero degrees and 180°, e.g. forces $F_b$ through $F_d$ and $F_f$ through $F_g$, have a component of force acting in the direction of rotation of the turbine, as is shown by their inclination toward the direction of rotation.

In this view, and with reference to FIGS. 16 and 17, and 3 and 4, a preferred embodiment of the torque sensitive control 44 is shown comprising a forward weight 47 and a rearward weight 48. The forward weight 47 has a bore 75 formed in a rearward lower hinge portion 77, through which the hinge pin 42 is inserted so that the forward weight 47 may freely rotate about the hinge pin 42 which mounts the blade form 40 to the outer end of the rotor 36. Similarly, the rearward weight 48 has a bore 74 positioned in a forward upper hinge portion 78 so that the hinge pin 42 may be positioned therethrough to rotatably mount the rearward weight 48. Shoulders 65 and 66 are formed facing outwardly on each of the weights 47 and 48 respectively, for engagement with inward sides 67 and 68 of the end cap 39, thereby limiting outward pivotal movement of the weights 47 and 48.

Inward pivotal movement of each weight is limited by engagement of a stop face 70 and 71 on each weight 47 and 48 respectively, one with the other. Engagement of the stop faces 70 and 71 transfers forces for movement of one weight, 47 for example, through the other weight 48 to the inward side 68 of the end cap 39 which is engaged with the shoulder 66 of the second weight 48.

A collar 51 is affixed to a central portion of the hinge pin 42 between the hinge portions 77 and 78 of the forward and rearward weights, 47 and 48, respectively. The collar 51 has a raised portion 60 extending outwardly which includes a forward face 62 and a rearward face 61. The forward weight 47 has a first finger portion 64 projecting around the collar 51 to engage the forward face 62 of the collar raised portion 60. The rearward weight similarly has a second finger portion 63 extending around the collar 51 to engage the rearward face 61 of the collar raised portion 60. A spring 46 is connected between each of the weights 47 and 48 and the end plate 39, to exert an outward force on each weight as they are inwardly pivoted. Each of the springs 46 is adjustably connected to the end cap 39 by means of a threaded eyelet 55 to which the spring is connected. Each threaded eyelet 55 extends through the end cap 39 and is laterally adjusted by adjusting nuts 56 threaded to its distal end. The tension force of the springs 46 maintains engagement of the weights 47 and 48 with the end cap 39 when there are no wind forces exerted against the sides of the blade form 40 to pivotally displace the blade and displace either of the weights 47 and 48 through coaction of their finger portions 63 or 64 with the collar 51 on the hinge pin 42.

As the force of a wind current is exerted against the outward face of the blade form 40, as in the 45° orbital position of the blade 40b in FIG. 10, the blade form 40 is rotated outwardly. As the hinge pin 42 to which blade 40 is connected turns, the rearward face 61 of the collar raised portion 60 pushes the finger portion 63 of the rearward weight 48 to inwardly rotate the rearward weight 48 with the blade 40, extending the spring 46, as is described with reference to the model of FIG. 14. The blade 40 will continue to pivot until the spring 46 has been extended sufficiently to apply a force balancing the force of the wind current against the side of the blade 40, or until the rearward weight 48 has moved maximum amount engaging the stop face 70 of the rearward weight 48 with the stop face 71 of the forward weight, to cease pivotal movement of the blade form 40.

Similarly, as a wind is applied to the inner face of the blade form 40, as in the 315° position of a blade form 40h in FIG. 10, the force exerted by the wind pivots the blade form 40 inwardly so that the forward face 62 of the collar raised portion 60 pushes on the finger portion 64 of the forward weight 47 to rotate the forward weight 47 inwardly. The spring 46 is thus extended as the blade increasingly pivots until sufficient force is exerted by the spring 46 to balance the force of the wind against the inside of the blade form 40, or the stop face 71 of the forward weight 47 engages the stop face 70 of the rearward weight 48, to cease pivotal movement of the blade form 40.

As a wind current exerts a force against either side of the blade form 40 to pivot the blade form, the collar raised portion 60 will engage only the first finger 64 of the forward weight 47, or the second finger 63 of the rearward weight 48, and pivotally displace only the forward weight 47 or the rearward weight 48 with the blade form 40. The other weight will he held in its outwardly stopped position by engagement of the shoulder 65 or 66 with the inner side, 67 or 68, of the end cap 39.

When no wind current is exerting force against the side of the blade form 40, both the forward and rearward weights 47 and 48 are held in a tangential position with the blade orbit 38 by the force of the springs on each of them. The forward weight shoulder 68 and the rearward weight shoulder 66 rest against the inside of the end cap 39. The raised portion 60 of the collar 51 is thus captured between the finger portions 64 and 63 of the forward and rearward weights 47 and 48, respectively, and maintain the blade form 40 in a substantially tangential position with its orbit 38, until sufficient force is applied against either of the side surfaces of the blade 40 to move a weight 47 or 48 and extend a spring 46, as was described supra in the model apparatus of FIG. 14.

As rotational speed of the turbine increases, the forward and rearward weights 47 and 48 mounted on the end of the rotor 36 are effected by centrifugal force acting on them to urge them outwardly. The centrifugal forces acting on them are added to the force exerted by the springs 46, as is described for the model in FIG. 10, increasingly restricting the pivotal movement of the blade form 40 until such speed is reached that the centrifugal forces dominate the forces exerted against the side of the blade by the wind. At this point, the centrifugal force is sufficient to maintain the shoulders 65 and 66 of the forward and rearward weights 47 and 48 against the inner surfaces 67 and 68 of the end cap 39. This position of the weights 47 and 48 restricts movement of the hinge pin 42 through the proximal positioning of the fingers 63 and 64 with the raised portion 60 of the collar 51 to hold the blade form in substantially tangential position with its orbit.

Therefore, as the turbine speed increases a centrifugal force acts on the forward and rearward weights, 47 and 48, positioned on the outer end of the rotors 36, to cause the transition from the starting and low speed mode of cyclical operation of the blade form 40, to a substantially fixed non-cyclical blade positioning for high speed operation of the turbine. The centrifugal force acting on each weight 47, 48 is applied to impose a force resisting pivotal movement of the blade form 40. As the rotational speed of the turbine increases the centrifugal force acting on each weight 47, 48 also increases to progressively limit pivotal movement of each blade form 40, as the centrifugal force counteracts the force exerted by the wind current on the blade form side surface.

In response to an increase in free-stream windspeed, the blade forms 40 may again initiate pivotal movement after having attained a steady-state non-pivotal operating condition. A windspeed increase results in a change in the direction and velocity of the relative wind current R, which affects the balance between the torque sensitive control 44 and the force exerted against the side of the blade 40 by the wind. The turbine will react by accelerating to increase rotational speed until a steady-state operating condition is again obtained where sufficient centrifugal force acts through the torque control weights 47 and 48 to restrain the blade form 40 from pivoting. By providing for response to a changing windspeed, the turbine produces increased torque and power which would normally be lost. It further eliminates the possibility of the turbine entering a stall condition resulting from directional changes of the relative wind caused by a wind gust.

By properly sizing the masses of the weights 47 and 48, and positioning their centers to provide appropriate lever arms through which they act, the torque produced by the turbine 10 can be matched to the torque required by the implement 28 driven, thereby obviating the need of a torque-varying transmission means or a load-varying means for the driven implement. A driven implement 28 may thus be selected of a sufficient size to use all of the power generated by the wind turbine 10 rather than be selected undersized, as is often done to prevent stalling of the wind turbine at low rotational speeds or in a low wind velocity.

The forward and rearward weights 47 and 48 are preferably designed so that the center of mass is positioned a maximum of distance from the hinge pin 42, to maximize the effect of centrifugal force acting on them relative to their size. This may require using material of non-uniform density, or complex casting techniques. It is preferred that the total weight of the fore and aft weights 47, 48 is minimized while maximizing the torque forces that they can apply to the hinge pin 42 to direct the blade form 40.

Figure 4:
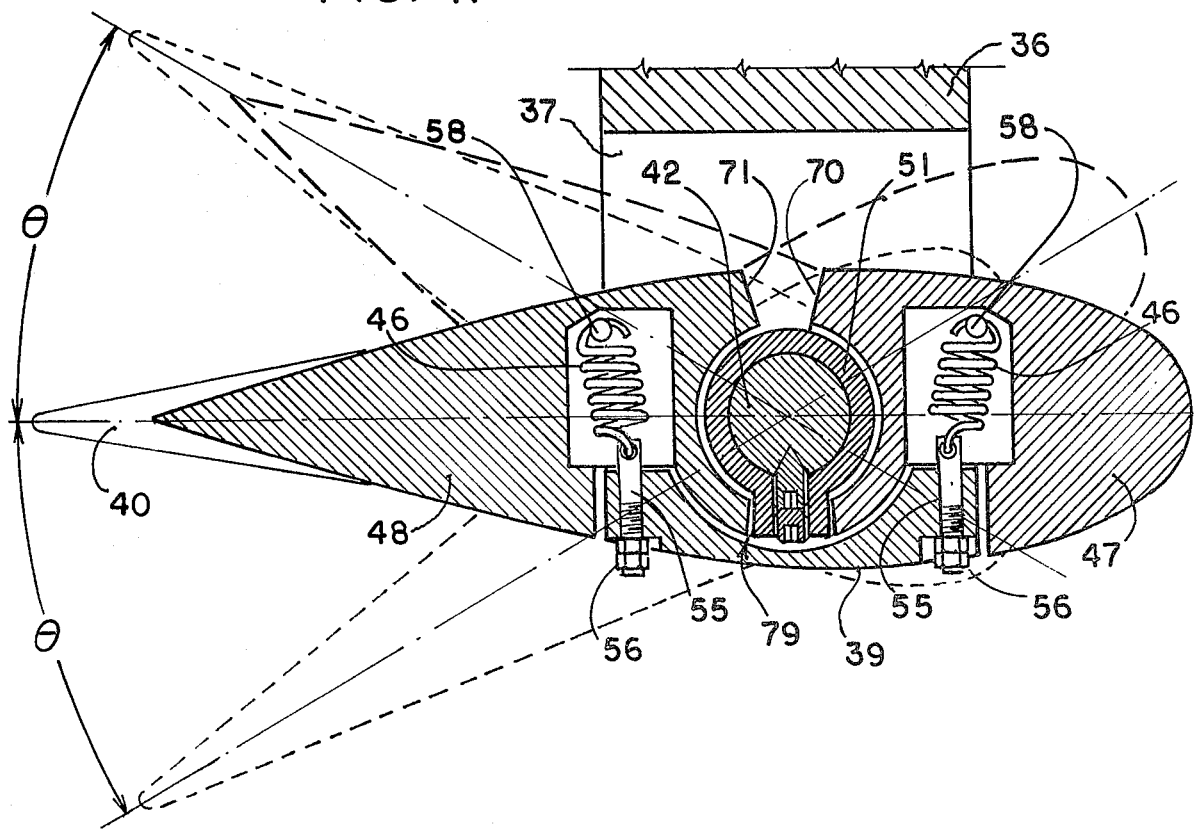
FIG. 4 is a horizontal sectional view of the torque sensitive means for controlling pivotal movement of the blade form taken generally along lines 4—4 of FIG. 3.

When the centrifugal forces acting on the fore and aft weights 47 and 48 are sufficient to maintain the blade form 40 in a substantially tangential position, their shapes are combine to form an airfoil-shaped section as shown in FIG. 4. Thus, at high rotational speeds, their combined shape will become a contributing factor to the production of lift force, rather than cause a parasitic drag.

The blade form 40 may be allowed a very slight pivotal movement when centrifugal forces hold the forward and rearward weights 47 and 48 in an outwardly stopped position, by providing for a small space 79 between the ends of the fingers 63 and 64 and the forward and rearward faces 61 and 62 of the collar raised portion 60. A resilient material (not shown) may also be positioned between the ends of the finger portions 63 and 64 and the faces 61 and 62 of the raised portion 60 of the collar 51 to absorb impact forces caused by rapid oscillatory movement of the blade form 40 at high turbine speeds. The resilient material would also allow for a very slight pivotal movement the blade form 40 when it is being firmly held at high speeds of the turbine 10. The tangential position of the blade form 40 as determined by the torque sensitive control 44 may be such that the chord line of the blade form 40 is skewed a few degrees from the tangent of the orbit, for beneficial performance characteristics.

Figure 15:
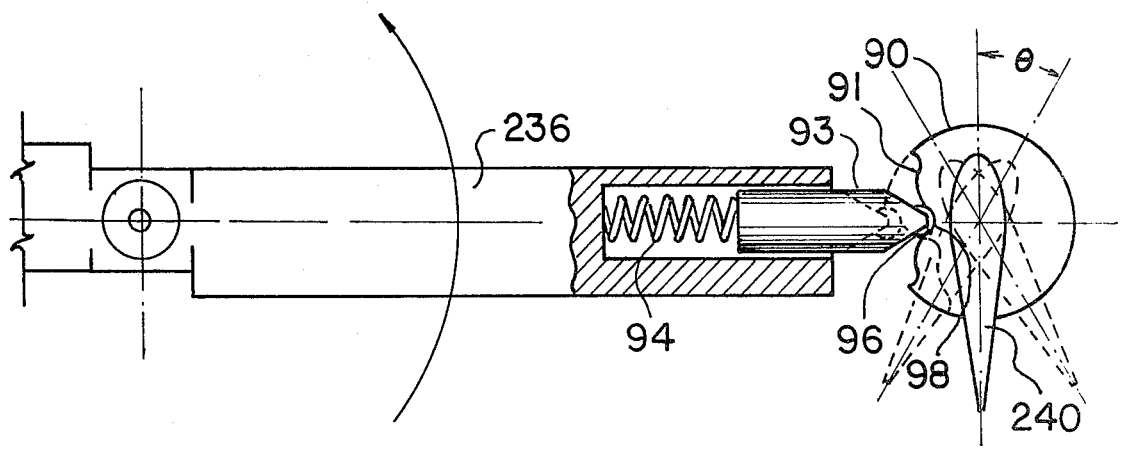
FIG. 15 is a diagrammatic representation of the torque sensitive means for controlling the pivotable motion of the blade, using a different mechanism incorporating a cam element.

FIG. 15 diagramatically illustrates an alternative design for controlling the pivotable movement of the blade form 240 using a torque sensitive control 44. A cam 90 having a cam face profile 91 is positioned to rotate with the hinge pin (not shown) as the blade form 140 is pivotally moved. A weight 93 and spring 94, similar to either of those previously described in FIG. 14, is positioned on the rotor 236 along its longitudinal axis and directed toward the vertical axis P about which the blade form 240 pivots. On the outer end of the weight 93 is positioned a follower 96 to ride against the cam face profile 91 for ease of sliding movement (such as a roller). As the blade 240 is pivoted the cam face profile 91 urges the follower 96 and the weight 93 inwardly compressing the spring 94. The tension exerted by the spring 94 thereby maintains the blade 240 in its tangential position until a force is exerted against the side of the blade 240 by the wind current W which is sufficient to compress the spring 94. As the rotor angular velocity increases the centrifugal force acting on the weight 93 also increases, and is added to the tension provided by the spring 94 to the follower 96, to urge the cam back to its central position. Movement of the follower into a valley 98 of the cam face 91 rigidly positions the blade form 240 in its tangential position, when the centrifugal force becomes sufficiently large to dominate wind forces acting on the blade form 240. The face 91 of the cam 90 can be so designed to provide for a selected pivotal movement of the blade 240 as desired.

Figure 12:
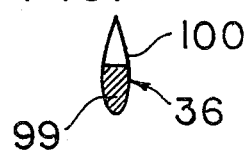
FIG. 12 is a sectional view of the rotor taken generally along lines 12—12 of FIG. 10.
Figure 13:
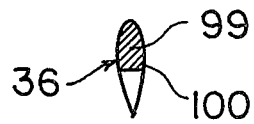
FIG. 13 is a sectional view of the rotor taken generally along lines 13—13 of FIG. 10.

The rotor 36 is designed of a construction that maximizes structural strength while minimizing parasitic drag. The rotor is comprised of a spar type member 99 running longitudinally along its length which transports the forces exerted through it to the shaft 30 on which it orbits, as is shown in FIGS. 12 and 13. A light weight faring 100 is positioned over the spar 99, and rearwardly, to provide an air foil-shaped surface for minimum drag characteristics.

The blade form 40 is designed and mounted so that the longitudinal axis extending through its center of mass is coincidental with the pivotal axis of the blade form 40, or in other words, the blade 40 is positioned so its center of mass is along the vertical axis of the hinge pin 42 on which it pivots. This is necessary to preclude an unbalanced condition of the blade 40 at high rotational speeds where centrifugal forces have brought into effect the torque sensitive control 44. The pivotal axis P of the blade 40 is positioned longitudinally through a forward portion of the blade cross section so that the forces of wind current acting upon the side of the blade 40 will pivotally displace the blade. This configuration requires placement of high density material in the leading edge of the blade form 40 to position the center of the mass of the blade coincidentally with its forwardly pivotal axis.

Referring now to FIGS. 5 through 9, the wind turbine blade form 40 is symmetrical in profile and is designed to have a surface contour approximating that of a NACA 0018 specification when under non-exerted conditions, as is shown in FIG. 5. The blade form 40 is comprised longitudinally of a forward positioned member 101 supporting a elastic skin covering 102. The skin covering 102 extends rearwardly on each side to a trailing edge member 103. Preferably, the blade form 40 has a deformable composite material 104 filling the interstice between the surface coverings 102 on each side and between the forward and trailing members 101 and 103.

The blade form 40 reacts to the forces of wind current by being formed into a performance enhancing profile. This formation generates maximum lift force for the blade 40 at any position in its orbit. The blade form 40 will deform in a like manner to either side to provide an enhanced airfoil shape, and will deform to increase its drag characteristic when it is moving in a downwind direction, with the wind current flowing from tail to head.

FIG. 6 illustrates an exaggeration of the deformation caused by a wind current W impinging upon the surface of a blade form 40 from its right side. It can be seen that the unexposed surface has formed a convex shape for the air current to flow across increasing the path the air must take on this side over the other side. This shape enhances the lift force F generated. FIG. 7 similarly shows an exaggerated illustration of the deformation of a blade form from the wind current W flowing against its left side.

FIG. 8 depicts the double concave formation exhibited by the blade form 40 from a wind current W flowing past the blade from back to front, where the downwind velocity of the blade 40 is less than that of the wind current W. It can be seen that the altered contours of the blade form surfaces 105 and 106 on both sides provide depressions to increase the drag force generated by the blade 40.

FIG. 9 shows a slight convex deformation of the blade surfaces 107 and 108 in a head-on position with wind flow W, to more closely approximates the NACA 0018 airfoil and provide correspondingly low drag. This profile of the blade can be found when the blade form 40 is positioned head-on with the wind at low rotational speeds and for both head-on and downwind positions of the blade when the tip speed T of the turbine increases above that of the wind current W.

It is preferable to manufacture the components of the rotor, the blade forms, and the torque sensitive blade limiting means of non-metallic material to preclude interference with radio signal devices, such as televisions and radios, when positioned near populated areas.

We claim:

1. A wind turbine for obtaining power from a wind flow comprising;
   a support structure;
   a rotor;
   means for mounting said rotor for rotation on said support structure about an axis of rotation;
   at least one blade form pivotally mounted on said rotor a distance from said axis of rotation for limited pivotal movement relative to said rotor, said blade form pivotally moving relative to said rotor in response to the force of a wind current against its sides to generate a rotational force for self-starting of said turbine and operation at low rotational speeds; and
   means for controlling said pivotal movement of said blade form relative to said rotor, said means progressively biasing said blade form toward one selected orientation relative to said rotor and thereby progressively limiting said pivotal movement of said blade form in response to increased rotational velocity of said rotor, said control means prohibiting said pivotal movement of said blade form at high rotational speeds of said turbine in a constant wind flow velocity.

2. A wind turbine for obtaining power from a wind flow comprising:
   a support structure;
   a rotor;
   means for mounting said rotor for rotation on said support structure about an axis of rotation;
   at least one blade form pivotally mounted on said rotor a distance from said axis of rotation for limited pivotal movement relative to said rotor, said blade form pivotally moving relative to said rotor in response to the force of a wind current against its sides to generate a rotational force for self-starting of said turbine and operation at low rotational speeds; and
   means for controlling bidirectionally said pivotal movement of said blade form relative to said rotor, said means progressively, bidirectionally opposing and thereby progressively, bidirectionally limiting said pivotal movement in response to changes in the direction of the relative wind current toward a tangent of the blade form path, said means prohibiting pivotal movement of said blade form from one selected orientation when it is subjected to relative wind currents within a selected range.

3. The wind turbine of claims 1 or 2 wherein said blade form comprises means for changing the surface contour of said blade form in response to forces of a wind flow to enhance generation of aerodynamic lift force by said blade form.

4. The wind turbine of claim 3 wherein said blade form is comprised of a deformable material, said material being formable into a convex surface contour on one side of said blade form and a concave surface contour on the other side of said blade form by force of a wind flow against a side of said blade form.

5. The wind turbine of claim 3 wherein said blade form is comprised of a deformable material, said material being formable into a convex or concave surface contour on either side of said blade form simultaneously by force of a wind flow.

6. The wind turbine of claim 3 wherein said blade form is comprised of a deformable structure including an elastic surface skin covering at least one internal frame member.

7. The wind turbine of claim 6 wherein said blade form further includes a resilient deformable material positioned within said elastic surface skin covering said blade form.

8. The wind turbine of claim 1 further comprising biasing means for providing bidirectionally limiting force opposing the pivotal movement about said one selected orientation of said blade form by force of the wind, said biasing means including means for adjustment of said opposing force.

9. The wind turbine of claims 1 or 2 wherein said blade form is positioned substantially tangential with its orbit when prohibited pivotal movement by said control means.

10. The wind turbine of claims 1 or 2 wherein said means for controlling pivotal movement of said blade form comprises:
    a first movable means for limiting pivotal displacement of said blade form inwardly of a tangent to its orbit, and a second movable means for limiting pivotal displacement of said blade form outwardly of a tangent to its orbit, said first and second means coacting to progressively limit the oscillatory pivotal movement of said blade form.

11. The wind turbine of claims 1 or 2 wherein said means for controlling pivotal movement of said blade form comprises:
    a cam having a shaped profile positioned about the pivotal axis of said blade form and pivotable with said blade form, said profile having a valley portion formed therein;
    a cam follower engaged with said cam profile for inward and outward movement relative to said cam as said cam is rotated;
    a means for applying force to said cam follower to rotatably urge said cam toward engagement of said valley portion of said cam with said follower.

12. The wind turbine of claim 11 wherein said means for applying force to said cam follower includes a weight slideably attached to said rotor, slideable along a path having a component in the radial direction.

13. The wind turbine of claim 12 wherein said means for applying force to said cam follower further includes a spring mounted to urge said follower toward said cam.

14. The wind turbine of claims 1 or 2 wherein said control means applies progressively increasing force to limit pivotal movement of said blade form with increasing speed of said rotor.

15. The wind turbine of claim 14 wherein said control means comprises a first control mechanism for urging said blade form clockwise and a distinct second control mechanism for urging said blade form counter-clockwise.

16. The wind turbine of claims 1 or 2 wherein said blade form is mounted for oscillatory pivotal movement on said rotor, said blade form pivoting about a pivotal axis parallel to said axis of rotation of said rotor, said pivotal axis positioned forwardly of a midpoint of a chord of said blade form.

17. The wind turbine of claim 16 wherein the center of mass of said blade form is substantially along the same longitudinal axis of said blade form as is said pivotal movement of said blade form.

18. A wind turbine for obtaining power from a wind flow, comprising:
- a support structure;
- a rotor rotatably mounted on said support structure, the rotation of said rotor about an axis of rotation;
- at least one blade form pivotally mounted on said rotor a distance from said axis of rotation for limited pivotal movement relative to said rotor, said blade form pivotally moving relative to said rotor in response to the force of a wind current against its sides to generate a rotational force for self-starting of said turbine and operation at low rotational speeds irrespective of the direction of the component of said wind flow which is not parallel to said axis of rotation; and
- means for controlling said pivotal movement of said blade form relative to said rotor, said means progressively opposing said pivotal movement of said blade form in response to increased rotational velocity of said rotor, said control means acting to selectively allow only slight pivotal movement of said blade form at high rotational speeds of said turbine in a constant wind flow velocity and direction.

19. A wind turbine for obtaining power from a wind flow, comprising:
- a support structure;
- a rotor rotatably mounted on said support structure, the rotation of said rotor about an axis of rotation;
- at least one blade form pivotally mounted on said rotor a distance from said axis of rotation, thereby constrained to orbit in a blade form path, for limited pivotal movement relative to said rotor, said blade form pivotally moving relative to said rotor in response to the force of a wind current against its sides to generate a rotational force for self-starting of said turbine and operation at low rotational speeds; and
- means for controlling bidirectionally said pivotal movement of said blade form relative to said rotor, said means progressively limiting said pivotal movement in response to changes in the direction of the relative wind current toward a tangent of said blade form path, said means acting to selectively allow only slight pivotal movement of said blade form bidirectional from said tangent when it is subjected to relative wind currents within a selected range.

20. A wind turbine for obtaining power from a wind flow comprising:
- a support structure;
- a rotor rotatably mounted about a rotor axis on said support structure;
- at least one blade form mounted on said rotor a distance from said rotor axis for orbital movement about said support structure along a blade form orbit, and shaped to generate aerodynamic lift force when positioned in a wind flow, said blade form pivotally mounted on said rotor to permit the force of a wind current against its sides to direct it in said wind current to generate force for rotation of said rotor; and
- control means for limiting pivotal movement of said blade form, said control means comprising:
  - (a) biasing means for urging said blade form toward a direction tangential with said blade form orbit regardless of said rotor speed; and
  - (b) means responsive to said rotor speed for urging said blade form toward a position tangential with said blade form orbit, said speed responsive means progressively limiting said pivotal movement of said blade form as rotor speed increases.

21. A wind turbine for obtaining power from a wind flow comprising:
- a rotor rotatably mounted on said support structure;
- a blade form mounted to said rotor for pivotal movement relative to said rotor;
- a first weight mounted to said rotor for applying a first centrifugal force to said blade form to limit clockwise pivotal movement of said blade form; and
- a second weight mounted to said rotor for applying a second centrifugal force to said blade form to limit counter-clockwise pivotal movement of said blade form, wherein at least either said first centrifugal force or said second centrifugal force is not affected by the angular acceleration of said rotor.

22. The wind turbine of claim 21, wherein said first weight and said second weight selectively operate individually, depending upon the side of said blade form exposed to the wind flow.

23. The wind turbine of claim 21, wherein a first center of mass of said first weight and a second center of mass of said second weight move with reference to the pivotal axis of said blade form as said blade form pivots, said movement of said first and second weights being in a direction which is substantially radial with regard to said rotor axis.

24. The wind turbine of claim 21, wherein said first weight and said second weight are mounted on said rotor for pivotal movement concentrically with said pivotal movement of said blade form.

25. In a wind turbine for obtaining power from a wind flow, a method for controlling the pitch of a blade pivotally mounted on a rotating rotor comprising:
(a) permitting oscillating pivotal movement of said blade at low rotational speeds of said rotor;
(b) progressively bidirectionally limiting said oscillating pivotal movement of said blade with the increase of said rotor rotational speed above low speed;

(c) prohibiting said oscillating pivotal movement of said blade at a first predetermined rotational speed of said rotor in a constant velocity wind current; and (d) permitting reocurrence of oscillating pivotal movement of said blade with increases of wind current velocity after said first predetermined rotational speed of said rotor is attained, until a second predetermined rotor speed is attained, said oscillatory pivotal movement of said blade prohibited at said second predetermined speed.

26. In a wind turbine for obtaining power from a wind flow, a method for self-starting said turbine and providing high torque at low turbine speeds and for maintaining high torque at high turbine speeds comprising:
(a) permitting bidirectionally limited oscillatory pivotal movement of a blade mounted on a rotor by force of a wind flow against its sides;
(b) biasing pivotal movement of said blade to urge it into a predetermined pitch position with a relative wind flow;
(c) progressively bidirectionally limiting pivotal movement of said blade as the tip speed of said blade increases relative to ambient wind speed; and
(d) prohibiting pivotal movement of said blade at selected tip speed ratios in a steady wind flow.

27. In a wind turbine for obtaining power from a wind flow, a method for self-starting said turbine and providing high torque at low turbine speeds and for maintaining high torque at high turbine speeds comprising:
(a) permitting limited oscillatory pivotal movement of at least one blade mounted on a rotor by force of a wind flow against its sides;
(b) biasing pivotal movement of said blade to urge it into a predetermined pitch position with a relative wind flow;
(c) progressively bidirectionally limiting pivotal movement of said blade as the speed of said turbine increases relative to ambient wind speed; and
(d) prohibiting pivotal movement of said blade at high turbine speeds in a steady wind flow.

28. A wind turbine, comprising:
a rotor;
a blade pivotally mounted on said rotor;
a first means for biasing the pivotal movement of said blade bidirectionally toward a center rotational position, said first means providing a biasing force which is not a function of rotor speed; and
a second means for biasing the pivotal movement of said blade bidirectionally toward said center rotational position, said second means providing a biasing force which is a function of rotor speed.

29. A wind turbine comprising:
at least one blade mounted for:
(a) rotation about an orbital axis, and
(b) pivotal movement about a blade axis in two directions from a center position; and
means for prohibiting said pivotal movement to position said blade at said center position at a predetermined rate of said rotation in a constant velocity wind.

30. A wind turbine comprising:
at least one blade mounted for:
(a) rotation about an orbital axis, and
(b) pivotal movement about a blade axis bidirectional about a center position; and
means for preventing said pivotal movement away from said center position during constant speed rotation above a minimum rotational speed, said means permitting said pivotal movement during acceleration of said rotation above said minimum rotational speed.

31. A wind turbine for obtaining power from a wind flow comprising:
a support structure;
a rotor;
means for mounting said rotor for rotation on said support structure about an axis of rotation;
at least one blade form;
mounting means for pivotally attaching said blade form to said rotor and for allowing said blade form to pivot in response to torque imposed upon said blade form by the wind; and
means on said blade form for controlling said pivotal movement, said controlling means providing no net torque on said blade form when said blade form is in a center position, and said controlling means abruptly applying a restoring torque when said blade form deviates in either direction from said center position, said controlling means increasing said abrupt restoring torque as the rotational velocity of said rotor increases.

32. The wind turbine of claim 31 wherein said controlling means consists solely of mechanical elements.

33. A wind turbine for obtaining power from a wind flow comprising:
a support structure;
a rotor;
means for mounting said rotor for rotation on said support structure about an axis of rotation;
at least one blade form;
mounting means for pivotally attaching said blade form to said rotor at a distance from said axis of rotation, and for allowing said blade form to pivot in response to torque imposed upon said blade form by the wind;
means, including at least one centrifugal weight for controlling said pivotal movement of said blade form by applying a restoring torque, said controlling means providing no net torque on said blade form when said blade form is in a center position, and wherein for the entire range of possible angular deflections, excluding some smaller, continuous range which includes said center position and which does not include either end point of said entire range, said centrifugal weight only moves in one direction when both said weight is applying a torque to said blade form and said blade form is moving away from said center position, said controlling means increasing said restoring torque as the rotational velocity of said rotor increases.

34. The wind turbine of claim 33 wherein said controlling means is actuated by the angular velocity of said rotor.

35. The wind turbine of claim 33 wherein said controlling means consists solely of mechanical elements.

36. A wind turbine for obtaining power from a wind flow comprising:
a support structure;
a rotor;
means for mounting said rotor for rotation on said support structure about an axis of rotation;
at least one blade form;

mounting means for pivotally attaching said blade form to said rotor and for allowing said blade form to pivot in response to torque imposed upon said blade form by the wind;

clockwise controlling means on said blade form for resisting said pivotal movement in a clockwise direction, said clockwise controlling means applying a torque on said blade form only when said blade form is displaced clockwise from a clockwise controlling means position, the torque applied by said clockwise controlling means increasing as the rotational velocity of said rotor increases; and separate counter-clockwise controlling means on said blade form for resisting said pivotal movement in the counter-clockwise direction, said counter-clockwise controlling means applying a torque on said blade form only when said blade form is displaced counter-clockwise from a counter-clockwise controlling means position, the torque applied by said counter-clockwise controlling means increasing as the rotational velocity of said rotor increases.

37. A wind turbine for obtaining power from a wind flow comprising:

a support structure;

a rotor;

means for mounting said rotor on said support structure for rotation about an axis of rotation;

at least one blade form;

mounting means at a distance from said axis of rotation of said rotor for pivotally attaching said blade form to said rotor and for allowing said blade form to pivot in response to torque imposed upon said blade form by the wind;

spring controlling means on said blade form for limiting said pivotal movement of said blade form, comprising at least one spring, said spring controlling means for resisting both clockwise and counter-clockwise deviations of said blade form at low rotational speeds; and centrifugal controlling means on said blade form for limiting both clockwise and counter-clockwise deviations of said blade form at high angular velocity of said rotor; said spring controlling means and said centrifugal controlling means never urging said blade form in opposite directions.

* * * * *

UNITED STATES PATENT AND TRADEMARK OFFICE
CERTIFICATE OF CORRECTION

PATENT NO. : 4,430,044
DATED : February 7, 1984
INVENTOR(S) : L. Kenyon Liljegren It is certified that error appears in the above—identified patent and that said Letters Patent is hereby corrected as shown below:

Column/Line

| | | |
|---|---|---|
| 3 | 42 | "of the blade respond" should be --of the blade upon-- |
| 5 | 15 | "charactristics" should be --characteristics-- |
| 10 | 45 | "tubine" should be --turbine-- |
| 14 | 27 | "force exerted" should be --forces exerted-- |
| 15 | 60 | "140" should be --240-- |

Signed and Sealed this

Second Day of October 1984

[SEAL]

Attest:

GERALD J. MOSSINGHOFF

Attesting Officer

Commissioner of Patents and Trademarks